Patented Mar. 2, 1954

2,671,113

UNITED STATES PATENT OFFICE 2,671,113

ALPHA NITRO SULFIDES

Norman Kharasch and James Lorne Cameron, Los Angeles, Calif., assignors to Commercial Solvents Corporation, Terre Haute, Ind., a corporation of Maryland No Drawing. Application March 9, 1951, Serial No. 214,833

8 Claims. (Cl. 260—609)

This invention relates to alpha nitro sulfides and a process for preparing them. More particularly it relates to the reaction of salts of nitroalkanes with sulfenyl compounds and to the novel and useful compounds produced thereby.

In accordance with the process of our invention, alkali metal and alkaline earth metal salts of nitroalkanes are mixed with sulfenyl compounds having the formula

in which R is alkyl, aryl, aralkyl, alkaryl, haloaryl, haloalkyl, nitroaryl, naphthyl, anthraquinonyl or heterocyclic radicals, and X is chlorine, bromine, thiocyanate or other negative radicals, e. g., acetate, dialkylmonothiophosphates, sulfite, etc., the corresponding acid of which is stronger than the nitroparaffin, and the resulting reaction product is separated in a suitable manner, such as by solvent extraction or distillation.

The alkali metal and alkaline earth metal salts of nitroalkanes react with the sulfenyl compounds defined above to give alpha nitro sulfides having the formula

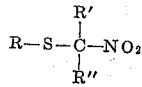

in which R is as defined above, and R' and R" are hydrogen or alkyl.

The alkali metal and alkaline earth metal salts of nitroalkanes suitable for use in our process are prepared by reacting an alkali metal or an alkaline earth metal alkoxide with the suitable nitroalkane. The following compounds will illustrate the class of salts of nitroalkanes suitable for use in our invention: sodium aci-nitroethane, sodium aci-nitropropanes, potassium aci-nitroethane, calcium aci-nitroethane, lithium aci-nitromethane.

The sulfenyl compounds used in our process can be prepared by known methods reported in the literature. For example, 2,4-dinitrobenzenesulfenyl chloride is prepared according to the method described by Kharasch et al., J. Am. Chem. Soc. 69, 1612; 2-nitrobenzenesulfenyl chloride according to the method of Hubacker, Organic Syntheses, Collective Volume II, page 455; 2-nitrobenzenesulfenyl bromide by the method of Zincke and Eismayer, Ber. 51, 751 (1918); p-toluenesulfenyl chloride by the method of Lecher et al., Ber. 58, 409 (1925); and 2-chloroethane-sulfenyl chloride by the method of Fuson et al., J. Org. Chem. 11, 471 (1946). Other sulfenyl compounds can, of course, be prepared by modifications of any of the methods given for the specific compounds above, or by the methods summarized in Chem. Rev., 39, No. 2, p. 269 (1946) and Acta. Chem. Scand., 1, 310 (1947).

Among the novel products of our invention the following may be cited as illustrations:

1-nitroethyl 2-chloroethyl sulfide
alpha-Nitroethyl p-tolyl sulfide
1-anthraquinonyl 1-nitropropyl sulfide
2,4-dinitrophenyl nitromethyl sulfide
2,4-dinitrophenyl 1-nitroethyl sulfide
2,4-dinitrophenyl 1-nitroisopropyl sulfide
2,4-dinitrophenyl 1-nitropropyl sulfide
2-nitrophenyl nitromethyl sulfide
2-nitrophenyl 1-nitroethyl sulfide
2-nitrophenyl 1-nitropropyl sulfide
2-nitrophenyl 1-nitroisopropyl sulfide In accordance with our invention the salt of the selected nitroalkane is first prepared by reaction of the latter with the alkali metal or alkaline earth metal alkoxide in alcohol, and the salt is isolated by filtration. Subsequent stirring of this salt with an approximately equivalent amount of the sulfenyl derivative in a suitable solvent, first at low temperature and finally at reflux temperature, yields products which are readily purified.

A critical feature of the process of our invention lies in the choice of reaction media. The successful interaction of the sulfenyl compounds with the salts of nitroalkanes, to yield alpha nitro sulfides, can be best effected in anhydrous, nonhydroxylic media. Small amounts of alcohol or water have profound effects on the yield and the nature of the products obtained. In absolute alcohol, for example, the reaction takes an entirely different course, leading to the formation of thiolsulfonic esters and disulfides as the major products. We have found that all anhydrous nonhydroxylic solvents which are inert to both the sulfenyl compounds and the nitroalkane salts can be used in our process to produce alpha nitro sulfides. Among the nonhydroxylic media which we have successfully employed in our process may be cited ether, dioxane, higher alkyl ethers, ligroins, benzene and other benzenoid hydrocarbons.

Ordinarily, we prefer to maintain a temperature of about —5° C., or slightly higher, during the addition of the salt of the nitroalkane to the sulfenyl compound, or vice versa. However, temperatures anywhere between —5° C. and 80° C. are suitable for this step in our process. We have found that the reaction is completed in a somewhat shorter time if the temperature of the mixture is raised after mixture of the reactants.

We are aware that some doubt might exist as to whether the products of our invention do actually have the structures of alpha nitro sulfides. For this reason, considerable study has been given to the question of the correct structure of the products. The analytical results suggest structures A, B, or polymers of these:

(1.) 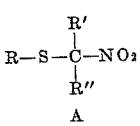 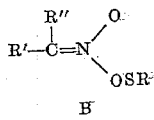

A           B

Cryoscopic molecular weight measurements have demonstrated that the products are monomers, and not polymers. The behavior of the products towards acids and bases is strongly in favor of the alpha nitro sulfide structure, for there is a marked resemblance to that of normal nitroalkanes. The product, 2,4-dinitrophenyl 1-nitropropyl sulfide, in which the nitro group is attached to a secondary carbon atom is soluble in aqueous sodium hydroxide solution, whereas 2,4-dinitrophenyl 1-nitroisopropyl sulfide, having a tertiary nitro group, is insoluble. In addition, the former is regenerated by treatment of the basic solution of the sulfide with dilute acetic acid. These results indicate that the products possess free nitro groups. Structure B, corresponding to certain of the compounds reported as products of a reaction of alkyl iodide with salts of nitroalkanes. (Thurston et al., J. Org. Chem. 2, 183), would certainly not be expected to be recoverable after alkali treatments, since it should be especially prone (like Schiff bases) to acid hydrolysis. Structure B may also be considered to represent the mixed anhydrides of sulfuric acids and aci-nitroalkanes, and these would certainly be susceptible to irreversable hydrolytic scission.

The most important evidence yet adduced to confirm the correctness of the alpha nitro sulfide structure is the independent synthesis of alpha nitroethyl p-tolyl sulfide from 1-chloro-1-nitroethane and the potassium salt of thiocresol. The product obtained in the latter reaction was identical in every respect with the one synthesized by reaction of sodium aci-nitroethane and p-toluenesulfenyl chloride.

The following examples will further illustrate our invention:

Example I

The preparation of 2,4-dinitrophenyl 1-nitropropyl sulfide was carried out as follows: To a stirred solution of 1.35 g. (0.025 mole) of sodium methoxide in 25 ml. of absolute alcohol was added dropwise 4.45 ml. (0.050 mole) of 1-nitropropane over a one minute period. A white precipitate of sodium 1-nitropropane was immediately produced. After three minutes of agitation, 25 ml. of ether was added. The finely-divided precipitate was collected by suction filtration and was washed with 25 ml. of ether. This product was added to a suspension of 5.86 g. (0.025 mole) of 2,4-dinitrobenzenesulfenyl chloride in 75 ml. of anhydrous ether at −5° C. The mixture was stirred for 30 minutes, without cooling, and then for 30 minutes at reflux temperature. The ether was removed by distillation, 5 ml. of water being added toward the completion of its removal. The orange residue was washed with 150 ml. of water and was collected by suction filtration. The yield of product, melting at 75–77° C., was 6.61 g. This was treated with 22 ml. of boiling methanol, leaving an undissolved residue of 0.50 g. which did not melt below 250° C. and was presumed to be 2,4-dinitrophenyl disulfide. On cooling, there precipitated from the methanol solution 4.89 g. of a yellow product melting at 79–81° C. Recrystallization from 25 ml. of carbon tetrachloride resulted in a yield of 4.00 g. of 2,4-dinitrophenyl 1-nitropropyl sulfide, M. P. 81.5–82.5° C. The yield of crude product was calculated to be 85%, and the yield of pure compound was 56%. Analysis calculated for $C_9H_9O_6N_3S$: C, 37.62%; H, 3.16%. Found: C, 37.78%; H, 3.09%.

Example II 2,4-dinitrophenyl 1-nitroisopropyl sulfide was prepared by the following procedure: In a solution of 15 ml. of absolute alcohol and 15 ml. of ether was dissolved 1.35 g. (0.025 mole) of sodium methoxide. To this was added dropwise a solution of 4.50 ml. (0.050 mole) of 2-nitropropane in 15 ml. of ether. A gelatinous white precipitate was immediately produced. After four minutes of agitation, 50 ml. of ether was added and the sodium aci-2-nitropropane was collected by filtration and washed with 50 ml. of ether. The product was transferred to 100 ml. of ether at −5° C. The mixture when stirred was very thick and gelatinous. After the addition of 5.86 g. (0.025 mole) of 2,4-dinitrobenzenesulfenyl chloride, this property became less apparent and the mixture became yellow in color. Stirring continued for 30 minutes, without cooling, and for 30 minutes at reflux temperature. The ether was removed by distillation, 10 ml. of carbon tetrachloride being added toward the end of this operation. The residue was refluxed with 50 ml. of carbon tetrachloride and the hot mixture was filtered. On cooling, 2.05 g. of yellow product melting at 90–95° C. precipitated from the carbon tetrachloride filtrate. Concentration of mother liquor yielded 0.78 g. of additional products. Two recrystallizations of the product yielded 1.75 g. of 2,4-dinitrophenyl 1-nitroisopropyl sulfide, M. P. 101–101.5° C. The yield of crude product was 40% and the yield of pure compound was 25%. Analysis calculated for $C_9H_9O_6N_3S$: C, 37.62%; H, 3.16%. Found: C, 37.82%; H, 3.53%.

Example III

The preparation of 2,4-dinitrophenyl 1-nitroethyl-sulfide was carried out as follows: The procedure described in Example I was followed, using 3.60 ml. (0.050 mole) of nitroethane, 1.55 g. (0.029 mole) of sodium methoxide and 5.86 g. (0.025 mole) of 2,4-dinitrobenzenesulfenyl chloride. Besides a 15% yield of a product decomposing above 250° (probably 2,4-dinitrophenyl disulfide), there was obtained a 74% yield of a yellow solid. Two recrystallizations of this product resulted in a 50% yield of 2,4-dinitrophenyl 1-nitroethyl sulfide, M. P. 117–118° C. Analysis, calculated for $C_8H_7O_6N_3S$: C, 35.18%; H, 2.58%. Found: C, 35.26%; H, 2.76%.

Example IV

The preparation of 2,4-dinitrophenyl nitromethyl sulfide was carried out by the following procedure: To a stirred solution of 0.050 mole of sodium ethoxide in 100 ml. of absolute alcohol, prepared by the addition of 1.14 g. (0.050 mole) of sodium to the alcohol, was added dropwise 4.05 ml. (0.075 mole) of nitromethane.

After one minute a white precipitate of sodium aci-nitromethane was collected by filtration and was washed with 50 ml. of ether. This product was added portionwise to a stirred solution of 5.86 g. (0.025 mole) of 2,4-dinitrobenzenesulfenyl chloride and 200 ml. of ether during a 20-minute period. After further stirring for 1 hour an orange precipitate (A) was collected by filtration. This was washed with 40 ml. of boiling carbon tetrachloride and 40 ml. of boiling methanol, leaving a dark residue which was soluble in water. By evaporation 0.09 g. of yellow product (B), melting at 121–125° C., was recovered from the carbon tetrachloride; similar treatment of the methanol yielded no residue. The ether filtrate (A) was concentrated, leaving 3.24 g. of yellow product. This was treated with 20 ml. of boiling carbon tetrachloride (filtrate C) leaving an undissolved residue, (D). On cooling, 2.28 g. of yellow product (E), melting at 83–90° precipitated from filtrate C. After recrystallizations from acetic acid and carbon tetrachloride, the M. P. was 96.5–97° and a mixed melting point with 2,4-dinitrobenzenesulfenyl chloride was not depressed. Product D almost completely dissolved in 20 ml. of boiling methanol, and this solution when concentrated yielded 0.79 g. of yellow (F), melting at 79–110° C. Mixture of (B) and (F) was recrystallized from methanol and chloroform four times, yielding 0.12 g. having a melting point of 128–129°. From the 0.88 g. of total crude product it is estimated that about 0.6 g. (10%) of theoretical yield was 2,4-dinitrophenyl nitromethyl sulfide. The yield in this case was decidedly much lower than in the case of the other nitroalkanes. Analysis calculated for $C_7H_5O_6N_3S$: C, 32.44%; H, 1.95%. Found: C, 32.63%; H, 2.05%.

*Example V*

2-nitrophenyl 1-nitropropyl sulfide was prepared in accordance with the following procedure: The procedure described in Example I was employed, using 4.45 ml. (0.050 mole) of 1-nitropropane, 1.55 g. (0.029 mole) of sodium methoxide, and 0.74 g. (0.025 mole) of 2-nitrobenzenesulfenyl chloride. There was an 84% yield of a product melting at 66–71°. Recrystallization from methanol and carbon tetrachloride yielded 56% 2-nitrophenyl 1-nitropropyl sulfide, M. P. 72.5–73.0°. Analysis, calculated for $C_9H_{10}O_4N_2S$: C, 44.62%, H, 4.16%. Found: C, 45.09%; H, 4.34%.

*Example VI*

By a procedure similar to that described in Example V, using 5.85 g. (0.025 mole) of 2-nitrobenzenesulfenyl bromide, a product was obtained which did not depress the melting point of that produced in Example V. The yield of crude products melting at 71–72° was 70% and the yield of pure compound melting at 72–73° was 56%. There was also a 20% yield of a compound melting at 191–192°. There was no depression observed in a mixed melting point determination of this latter product with a known sample of 2-nitrophenyl disulfide.

*Example VII*

When 5.30 g. (0.025 mole) of 2-nitrobenzenesulfenyl thiocyanate was used in place of the 2-nitrobenzenesulfenyl chloride of Example V, the yields were 72% pure 2-nitrophenyl 1-nitropropyl sulfide (77% crude) and 10% 2-nitrophenyl disulfide.

*Example VIII*

The preparation of 2-nitrophenyl 1-nitroisopropyl sulfide was carried out as follows: The procedure described in Example I was repeated, using 4.75 g. (0.025 mole) of 2-nitrobenzenesulfenyl chloride, and sodium aci-2-nitropropane prepared from 1.80 g. (0.033 mole) of sodium methoxide and 4.50 ml. (0.050 mole) of 2-nitropropane by the method of Example II. There was, in addition to high melting by-products, a yield of 2.18 g. impure product melting at 79–81° and, on recrystallization from carbon tetrachloride at 81–82°. The yields were calculated to be 36% impure and 25% of pure 2-nitrophenyl 1-nitroisopropyl sulfide. Analysis, calculated for $C_9H_{10}O_4N_2S$: C, 44.62; H, 4.16. Found: C, 44.81; H, 4.10.

*Example IX*

2-nitrophenyl 1-nitroethyl sulfide was prepared by the procedure described in Example I, using 3.60 ml. (0.050 mole) of nitroethane, 1.55 g. (0.029 mole) of sodium methoxide, and 4.74 g. (0.025 mole) of 2-nitrobenzenesulfenyl chloride. After removal of the ether, the orange residue was stirred for four hours with 150 ml. of water and the mixture was cooled at 5° for 10 hours. The product was collected by suction filtration and washed with three 5 ml. portions of cold methanol (A), which removed the orange color. The yellow residue was dried at 40°, yielding 1.008 g. of product melting at 58–130°. This was treated with 15 ml. of methanol (B) at 45°, leaving 0.30 g. of undissolved material, M. P. 192–194°. The methanol (B) was concentrated, using a dry-air stream, to 5 ml., yielding 0.54 g. melting at 51–57°, and finally to a yellow residue of 0.17 g. melting at 51–56°. Methanol solution (A) was left overnight at −5°, yielding 2.476 g. of precipitate melting at 52–56°. By repeated evaporation of the mother liquor and dilution of the oil residue with cold methanol, additional material, 0.20 g., melting at 140–190°, was collected. The total yield of crude product was 3.19 g. (56%), and by two recrystallizations from methanol, 2.3 g. (41%) of 2-nitrophenyl 1-nitroethyl sulfide, M. P. 57–58°, was obtained. Analysis: Calculated for $C_8H_8O_4N_2S$; C, 42.11%; H, 3.53%. Found: C, 42.36%; H, 3.53%.

*Example X*

2-nitrophenyl nitromethyl sulfide was prepared as follows: The procedure described in Example IV was repeated, using 5.40 g. (0.10 mole) of sodium methoxide, 8.1 ml. (0.15 mole) of nitromethane, and 9.48 g. (0.050 mole) of 2-nitrobenzenesulfenyl chloride. By fractional recrystallization, using methanol and carbon tetrachloride, 1.30 g. of product melting at 57–70° was isolated from the higher-melting by-products. Further recrystallization raised the melting point to 70–71°. The yield of crude product was 12%.

*Example XI*

The preparation of 1-anthraquinonyl 1-nitropropyl sulfide was carried out according to the following procedure: Sodium aci-1-nitropropane was prepared by the method of Example I, using 0.432 g. (0.008 mole) of sodium methoxide. To a stirred suspension of half of this product in 50 ml. of benzene was added portionwise 0.534 g. (0.002 mole) of 1-anthraquinonesulfenyl chloride. After 20 minutes the remaining sodium aci-1-nitropropane, which had been protected under benzene was added and the mixture was stirred at reflux temperature for 40 minutes. The cooled mixture was filtered, and the filtrate was concentrated, leaving 0.443 g. of orange product melting at 137–143°. This was extracted with 5 ml. of hot benzene leaving 0.08 g. of yellow residue melting above 250°. A yellow product, decomposing at 145°, precipitated from the benzene solution on cooling. Recrystallizations from carbon tetrachloride raised the decomposition point to 158°. The yields were calculated to be 64% impure and 43% of pure 1-anthraquinonyl 1-nitropropyl sulfide. Analysis, calculated for $C_{17}H_{13}O_4NS$: C, 62.37%; H, 4.00%. Found: C, 62.11%; H, 4.07%.

Example XII

The preparation of alpha-1-nitroethyl p-tolyl sulfide was carried out as follows: Sodium acinitroethane, prepared by the method described in Example III, using 3.78 g. (0.070 mole) of sodium methoxide, was added portionwise over a 20-minute period to a stirred solution of 8.4 g. (0.053 mole) of p-toluenesulfenyl chloride in 250 ml. of ether kept at —10 to 0° C. The ether was removed by distillation, leaving 7.5 g. of yellow oil.

The yield of crude product, estimated from the amount of sulfone obtained from it, was about 80–90%. Distillation in a molecular still assembly at 30–40° C. resulted in a nearly colorless liquid product. The product of this experiment was identical with a sample of alpha nitroethyl p-tolyl sulfide produced by reacting 1-chloro-1-nitroethane with the potassium salt of thiocresol.

Example XIII

The preparation of 1-nitroethyl 2-chloroethyl sulfide was carried out as follows: Sodium acinitroethane, prepared from 2.76 g. (0.12 mole) of sodium and 14.4 ml. (0.20 mole) of nitroethane in 100 ml. of absolute ethanol was added portionwise to a stirred solution of 13.5 g. (0.103 mole) of 2-chloroethanesulfenyl chloride in 250 ml. of anhydrous ether at 5° over a 20-minute period. After an additional ninety minutes of stirring at 5°, the white mixture was filtered. The filtrate was concentrated to 100 ml. under reduced pressure, washed with 50 ml. of water and dried over anhydrous sodium sulfate. Removal of the ether at reduced pressure left a residue of 15 ml. orange liquid. This product was insoluble in water and decomposition at about 90° resulted when a distillation at 3 mm. was attempted.

As a further means of identification of the product as 1-nitroethyl 2-chloroethyl sulfide, the following experiment was conducted: A solution of 7 g. of the product, 30 ml. of 30% hydrogen peroxide and 100 ml. of glacial acetic acid was left at room temperature for six days. The solvent was removed under reduced pressure and the residual oil refrigerated for two days. The resulting solid product was washed with water and air-dried to constant weight, 5.60 g. The white crystals, melting at 50–51°, were recrystallized from aqueous methanol to melt at 51.5–52.5°. The yield of 1-nitroethyl 2-chloroethyl sulfone was 58% based on sulfenyl chloride. Analysis calculated for $C_4H_8O_4NSC$: C, 23.82; H, 4.00. Found: C, 24.08; H, 4.05.

Example XIV

Using a procedure similar to that of Example I, 2,4-dinitrobenzenesulfenyl acetate can be reacted with sodium aci-1-nitropropane, yielding 2,4-dinitrophenyl 1-nitropropyl sulfide.

Example XV p-Chlorobenzenesulfenyl chloride (prepared by the method of Gebauer-Fülnegg, J. Am. Chem. Soc., 49, 2270 (1927)) is treated with sodium acinitroethane in the manner described in Example XII, to yield p-chlorophenyl alpha-nitroethyl sulfide.

Example XVI 2,5-dichlorobenzenesulfenyl chloride is prepared by the method of Miller and Smiles (J. Chem. Soc., 127, 224 (1925)) and interacted with sodium aci-1-nitropropane to give an oil, consisting of 2,5-dichlorophenyl 1-nitropropyl sulfide. The method employed is similar to that used for synthesis of p-tolyl alpha-nitroethyl sulfide in Example XII.

Example XVII 2-benzothiazolsulfenyl chloride is prepared by methods cited in Chem. Revs., 39 280 (1946). By reaction with sodium aci-1-nitropropane, and working up the product in the same manner as that used in the case of 1-anthraquinonyl 1-nitropropyl sulfide in Example XI, there is obtained 2-benzothiazolyl 1-nitropropyl sulfide.

Example XVIII 2-naphthalenesulfenyl thiocyanate (prepared from 2-mercaptonaphthalene and thiocyanogen by the method of Lecher and Wittwer (Ber., 55, 1474 (1922)) is used for the preparation of 2-naphthyl alpha-nitroalkyl sulfides. Thus, the sulfenyl thiocyanate may be used by a method similar to that of Example I (making certain to maintain the temperature during the reaction at 0° C., to prevent decomposition of the sulfenyl thiocyanate) to form 2-naphthyl 1-nitropropyl sulfide.

Example XIX 2-methyl-2-propanesulfenyl chloride (obtained by chlorinoylsis of di-t-butyl disulfide (Ind. Eng. Chem., 42, 919 (1950)) is treated with sodium aci-nitroethane to form the corresponding oily t-butyl 1-nitroethyl sulfide.

Example XX

Sodium aci-phenylnitromethane and 2-nitrobenzenesulfenyl chloride react to form 2-nitrophenyl phenylnitromethyl sulfide, using a procedure similar to that in the case of p-tolyl 1-nitroethyl sulfide in Example XII.

The products of our invention are useful in numerous applications. For example, they are useful as intermediates in the preparation of other compounds, such as the sulfones and oximes. In addition, some of the novel alpha nitro sulfides are particularly useful as fungicides, bactericides, insecticides and miticides. As an example of the latter use may be cited results obtained with 2,4-dinitrophenyl 1-nitropropyl sulfide against the red spider mite (*Tetranychus atlanticus* McG.). A dilution of 0.1% of the material gave a 100% kill of the mites in 48 hours.

We claim:

1. As new compositions of matter alpha nitro sulfides having the formula:

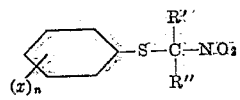

wherein $x$ is —NO$_2$, $n$ is one of the integers 1 and 2, and R' and R'' are members selected from the group consisting of hydrogen and alkyl radicals.

2. As new compositions of matter alpha nitro sulfides having the formula:

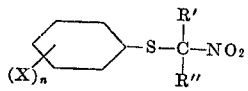

wherein X is —NO$_2$, $n$ is one of the integers 1 and 2, and R' and R'' are members selected from the group consisting of hydrogen, methyl, ethyl and propyl.

3. 2,4-dinitrophenyl 1-nitropropyl sulfide.
4. 2-nitrophenyl 1-nitropropyl sulfide.
5. In the process for producing alpha nitro sulfides having the formula:

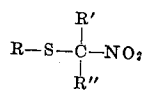

wherein R is the member selected from the group consisting of alkyl, aryl, aralkyl, alkaryl, and heterocyclic, radicals, and R' and R'' are members selected from the group consisting of hydrogen and alkyl, the step which comprises reacting a sulfenyl compound having the formula:

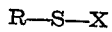

wherein R has the above defined values and X is a member selected from the group consisting of chlorine, bromine, acetate, dialkylmonothiophosphates, phosphate, sulfite and thiocyanate radicals, with a member selected from the group consisting of alkali metal and alkaline earth metal salts of nitroalkanes in an anhydrous, non-hydroxylic medium.

6. The process for producing alpha nitro sulfides having the formula:

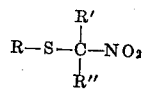

wherein R is the member selected from the group consisting of alkyl, aryl, aralkyl, alkaryl, and heterocyclic, radicals, and R' and R'' are members selected from the group consisting of hydrogen and alkyl, which comprises reacting a sulfenyl compound having the formula:

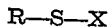

wherein R has the above defined values and X is a member selected from the group consisting of chlorine, bromine, acetate, dialkylmonothiophosphates, phosphate, sulfite and thiocyanate radicals, with a member selected from the group consisting of alkali metal and alkaline earth metal salts of nitroalkanes in an anhydrous, non-hydroxylic medium selected from the group consisting of ether, higher alkyl ethers, dioxane, ligroins, benzene, and other benzenoid hydrocarbons at a temperature of from about —5° C. to about 80° C., limiting the temperature to not higher than 0° C. when X is a thiocyanate radical.

7. A process for producing 2,4-dinitrophenyl 1-nitropropyl sulfide which comprises reacting a member selected from the group consisting of 2,4-dinitrobenzenesulfenyl chloride, 2,4-dinitrobenzenesulfenyl bromide and 2,4-dinitrobenzenesulfenyl thiocyanate with a member selected from the group consisting of alkali metal and alkaline earth metal salts of nitropropane in an anhydrous, non-hydroxylic medium selected from the group consisting of ether, higher alkyl ethers, dioxane, ligroins, benzene and other benzenoid hydrocarbons at a temperature of from about —5° C. to about 80° C., the temperature being limited to not higher than 0° C. when 2,4-dinitrobenzenesulfenyl thiocyanate is used.

8. The process for producing 2-nitrophenyl nitropropyl sulfide which comprises reacting a member selected from the group consisting of 2-nitrobenzenesulfenyl chloride, 2-nitrobenzenesulfenyl bromide and 2-nitrobenzenesulfenyl thiocyanate with a member selected from the group consisting of alkali metal and alkaline earth metal salts of nitropropane in an anhydrous non-hydroxylic medium selected from the group consisting of ether, higher alkyl ethers, dioxane, ligroins, benzene and other benzenoid hydrocarbons at a temperature of from about —5° C. to about 80° C., the temperature being limited to not higher than 0° C. when 2-nitrobenzensulfenyl thiocyanate is used.

JAMES LORNE CAMERON.
NORMAN KHARASCH.

References Cited in the file of this patent

UNITED STATES PATENTS

| Number | Name | Date |
|---|---|---|
| 2,109,464 | Cantrell | Mar. 1, 1938 |

FOREIGN PATENTS

| Number | Country | Date |
|---|---|---|
| 588,584 | Germany | Nov., 1938 |
| 584,793 | Great Britain | Jan. 23, 1947 |

OTHER REFERENCES

Chemical Abstracts, vol. 31, page 8504.